(12) United States Patent
Ito

(10) Patent No.: US 10,455,993 B2
(45) Date of Patent: Oct. 29, 2019

(54) TOILET

(71) Applicant: DAIKI CO., LTD., Tokyo (JP)

(72) Inventor: Hiroshi Ito, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 16/058,664

(22) Filed: Aug. 8, 2018

(65) Prior Publication Data

US 2018/0344102 A1 Dec. 6, 2018

Related U.S. Application Data

(63) Continuation of application No. PCT/JP2016/056208, filed on Mar. 1, 2016.

(51) Int. Cl.
*A47K 11/00* (2006.01)
*A47K 11/04* (2006.01)
*A01K 1/01* (2006.01)
*A47K 11/02* (2006.01)
*E03D 9/00* (2006.01)

(52) U.S. Cl.
CPC ............ *A47K 11/00* (2013.01); *A01K 1/01* (2013.01); *A01K 1/0114* (2013.01); *A47K 11/02* (2013.01); *A47K 11/04* (2013.01); *E03D 9/00* (2013.01)

(58) Field of Classification Search
CPC ..................................................... A47K 11/02
USPC ............................................................ 4/479
See application file for complete search history.

(56) References Cited

FOREIGN PATENT DOCUMENTS

JP 2003-180182 A 7/2003

*Primary Examiner* — Lori L Baker
(74) *Attorney, Agent, or Firm* — Oliff PLC

(57) ABSTRACT

A toilet suppresses the escape of odor from an upper part of a box-shaped main body part into which urine is excreted and includes a shielding member. The main body part has a bottom surface part and a side surface part. The shielding member projects from the inner surface of the side surface part toward the inside of the main body part, and blocks odor from the urine from rising.

20 Claims, 19 Drawing Sheets

TOILET

CROSS REFERENCE TO RELATED APPLICATION

This is a Continuation of International Application No. PCT/JP2016/056208 filed Mar. 1, 2016. The contents of this application are hereby incorporated by reference in their entirety.

TECHNICAL FIELD

The present invention relates to a toilet for animal or human use.

BACKGROUND ART

The toilet disclosed in Patent Document 1 can be given as an example of a conventional toilet. The toilet described in this document is a toilet for animal use, and includes a box-shaped main body part and a partition member (a drainboard) disposed within the main body part. The inner space of the main body part is partitioned into upper and lower parts by the partition member. Many low-absorbency granules are provided in the space above the partition member. A water-absorbent sheet is provided in the space below the partition member. According to the toilet configured in this manner, animal urine passes among the granules and through the partition member, and is then absorbed by the water-absorbent sheet.

CITATION LIST

Patent Document

Patent Document 1: JP 2003-180182A

SUMMARY OF INVENTION

Technical Problem

According to the toilet described in Patent Document 1, urine absorbed by the water-absorbent sheet remains inside the main body part. If the urine gives off odor, that odor may rise up within the main body part and escape to the exterior of the toilet from the upper part of the main body part. This can cause discomfort for a user (the owner of the animal or the like).

Solution to Problem

Having been achieved in light of the foregoing issue, an object of the present invention is to provide a toilet that can suppress the escape of odor from an upper part of a main body part.

A toilet according to the present invention includes: a main body part into which urine is excreted, the main body part including a first bottom surface part and a first side surface part and having a box shape; and a first shielding member, provided projecting from an inner surface of the first side surface part toward the inside of the main body part, that blocks odor from the urine from rising.

In this toilet, the shielding member that blocks odor from urine from rising is provided in the main body part. Thus even if odor rises from urine within the main body part, that odor can be blocked, and the escape of odor from the upper part of the main body part can be suppressed.

Advantageous Effects of Invention

According to the present invention, a toilet capable of suppressing the escape of odor from the upper part of the main body part can be realized.

DESCRIPTION OF EMBODIMENTS

Figure 1:
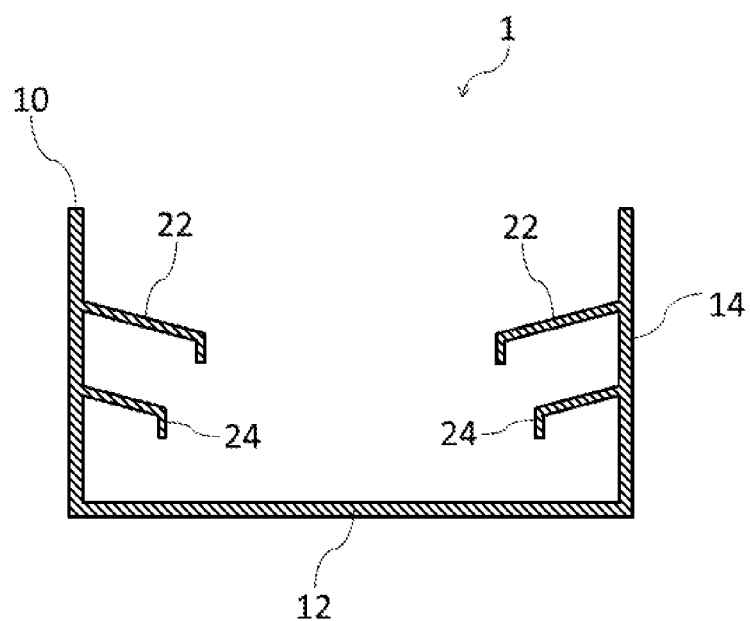
FIG. 1 is an end view illustrating a first embodiment of a toilet according to the present invention.

Embodiments of the present invention will be described in detail hereinafter with reference to the drawings. In the drawings, identical elements are given identical reference signs, and descriptions thereof will not be repeated.

First Embodiment

FIG. 1 is an end view illustrating a first embodiment of a toilet according to the present invention. A toilet 1 is a toilet for animal or human use, and includes a main body part 10, as well as a shielding member 22 (a first shielding member) and a shielding member 24 (a second shielding member). The main body part 10 is shaped as a box, and includes a bottom surface part 12 (a first bottom surface part) and a side surface part 14 (a first side surface part). The main body part 10 functions as a toilet bowl into which urine is excreted. A resin such as polypropylene or polyethylene can be used as the material of the main body part 10.

The bottom surface part 12 is substantially rectangular when viewed in plan view. Accordingly, the main body part 10 is provided with four of the side surface parts 14. The outer shape of the main body part 10 is substantially a parallelepiped.

The shielding member 22 blocks the rise of odor from urine excreted into the main body part 10. The shielding member 22 has a plate shape, and is provided so as to project into the main body part 10 from the inner surfaces of the side surface parts 14. A base of the shielding member 22 is located on the inner surfaces of the side surface parts 14, and a leading end of the shielding member 22 is located within an inner space of the main body part 10. The shielding member 22 is inclined downward toward the inside of the main body part 10. Both an upper surface and a lower surface of the shielding member 22 are inclined downward toward the inside of the main body part 10. The shielding member 22 is also partially bent downward. Specifically, a part of the shielding member 22 near the leading end thereof is bent so as to face downward in the vertical direction. Note that no holes are provided in the shielding member 22. A resin such as polypropylene or polyethylene can be used as the material of the shielding member 22.

Figure 2:
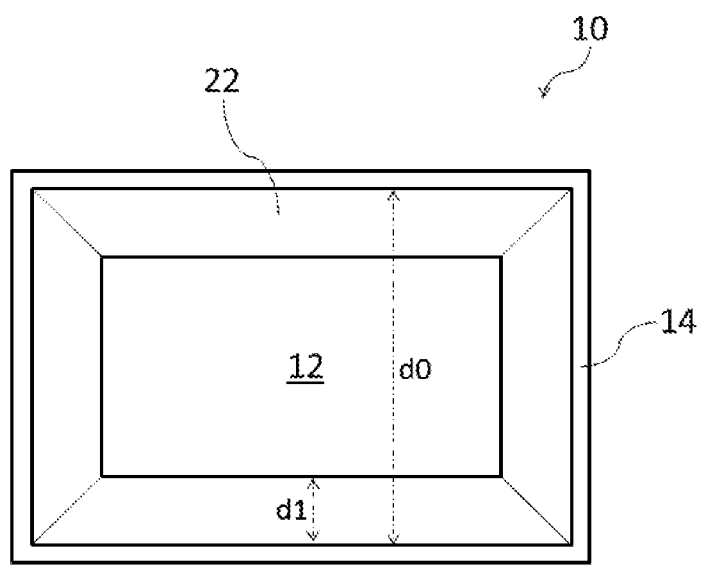
FIG. 2 is a diagram illustrating the structure of a shielding member 22.

FIG. 2 is a plan view of the main body part 10. As can be understood from this diagram, the shielding member 22 is, when viewed in plan view, provided across the entirety of the inner surfaces of the side surface parts 14. In other words, the shielding member 22 is provided in an annular shape. Thus while there is an opening in the part surrounded by the shielding member 22, that opening is large enough to not interfere with the passage of granules 32, which will be described later. When viewed in plan view, a projection length d1 of the shielding member 22 is preferably greater than or equal to ⅛ and less than or equal to ¼ a minimum inner dimension d0 of the main body part 10 in a plane including the base of the shielding member 22. Here, the "minimum inner dimension" of the main body part 10 refers to the minimum value of a distance between two intersecting points between a straight line passing through the center of the main body part 10 and the inner surfaces of the side surface parts 14. If the planar shape of the main body part 10 is rectangular as in the present embodiment, the minimum inner dimension thereof is equal to the inner dimension in the short side direction.

Returning to FIG. 1, the shielding member 24 blocks the rise of odor from urine excreted into the main body part 10. The shielding member 24 has a plate shape, and is provided so as to project into the main body part 10 from the inner surfaces of the side surface parts 14. A base of the shielding member 24 is located on the inner surfaces of the side surface parts 14, and a leading end of the shielding member 24 is located within an inner space of the main body part 10. The shielding member 24 is located between the shielding member 22 and the bottom surface part 12. In other words, the shielding member 24 is provided at a lower position (a position closer to the bottom surface part 12) than the shielding member 22. The shielding member 24 is inclined downward toward the inside of the main body part 10. Both an upper surface and a lower surface of the shielding member 24 are inclined downward toward the inside of the main body part 10. The shielding member 24 is also partially bent downward. Specifically, a part of the shielding member 24 near the leading end thereof is bent so as to face downward in the vertical direction. Note that no holes are provided in the shielding member 24. A resin such as polypropylene or polyethylene can be used as the material of the shielding member 24.

Figure 3:
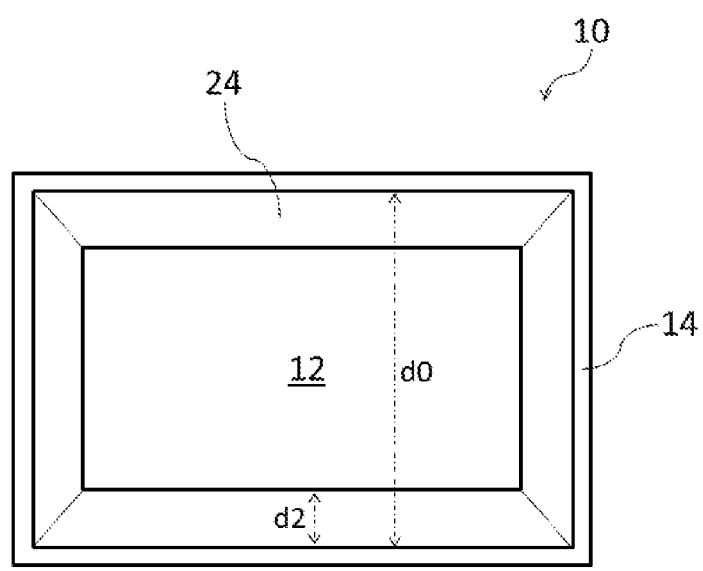
FIG. 3 is a diagram illustrating the structure of a shielding member 24.

FIG. 3 is a plan view of the main body part 10. Note that the shielding member 22 is not illustrated in this diagram. As can be understood from this diagram, the shielding member 24 is, when viewed in plan view, provided across the entirety of the inner surfaces of the side surface parts 14. In other words, the shielding member 24 is provided in an annular shape. Thus while there is an opening in the part surrounded by the shielding member 24, that opening is large enough not to interfere with the passage of the granules 32, which will be described later. When viewed in plan view, a projection length d2 of the shielding member 24 is preferably greater than or equal to ⅛ and less than or equal to ¼ the minimum inner dimension d0 of the main body part 10 in a plane including the base of the shielding member 24. The projection length d1 of the shielding member 22 when viewed in plan view is longer than the projection length d2 of the shielding member 24 when viewed in plan view. At least part of the shielding member 22 and at least part of the shielding member 24 overlap when viewed in plan view. In the present embodiment, part of the shielding member 22 and the entire shielding member 24 overlap when viewed in plan view.

Figure 4:
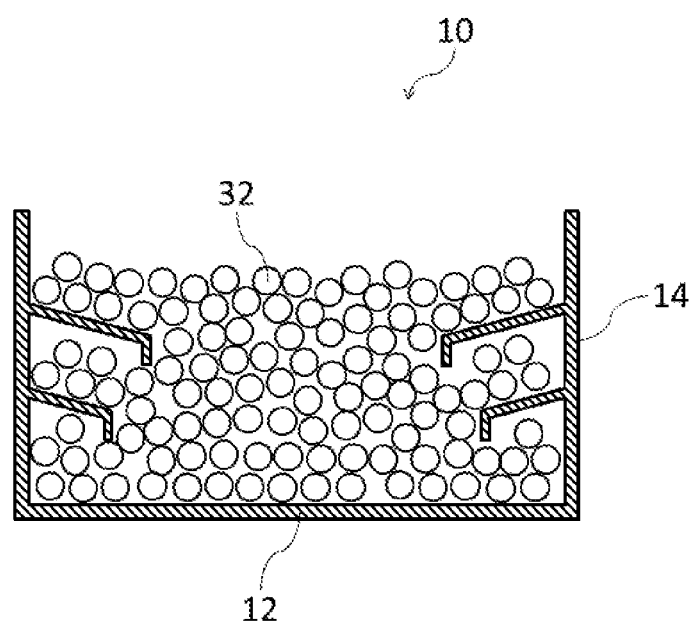
FIG. 4 is an end view illustrating the main body part 10 when in use.

FIG. 4 is an end view illustrating the main body part 10 when in use. When the toilet 1 is to be used, a plurality of the granules 32 are laid within the main body part 10. The granules 32 are laid directly upon the bottom surface part 12. When laying the granules 32, the granules 32 poured into the main body part 10 from the upper part of the main body part 10 pass through the opening in the part surrounded by the shielding member 22 and through the opening in the part surrounded by the shielding member 24, and fall onto the bottom surface part 12. In this manner, the granules 32 are laid within spaces under the shielding members 22 and 24 as well. The granules 32 are a water-absorbent toilet bedding material that absorbs urine. Preferably, the granules 32 have antibacterial properties. Preferably, the granules 32 also have anti-odor or deodorizing properties.

Effects of the toilet 1 will be described. In the toilet 1, the shielding member 22 that blocks odor from urine from rising is provided in the main body part 10. Thus even if odor rises from urine within the main body part 10, that odor can be blocked, and the escape of odor from the upper part of the main body part 10 can be suppressed.

Furthermore, the shielding member 24 is provided between the shielding member 22 and the bottom surface part 12. Accordingly, odor rising in the main body part 10 can be blocked in two stages. This makes it possible to more effectively suppress the escape of odor from the upper part of the main body part 10.

The projection length d1 of the shielding member 22 when viewed in plan view is longer than the projection length d2 of the shielding member 24 when viewed in plan view. Accordingly, odor not completely trapped by the shielding member 24 is more easily trapped by the shielding member 22.

Odor from the urine excreted into the main body part 10 rises while dispersing in the horizontal direction. Odor therefore flows more easily along the inner surfaces of the side surface parts 14 in particular. Providing the shielding members 22 and 24 so as to project from the inner surfaces of the side surface parts 14 toward the inner side of the main body part 10 is advantageous in terms of catching odor rising along the inner surfaces of the side surface parts 14.

Increasing the projection length d1 of the shielding member 22 is advantageous in terms of enhancing the odor-blocking effect. On the other hand, if the projection length d1 is too long, problems such as the granules 32 clogging the opening in the part surrounded by the shielding member 22 may arise. From this standpoint, the projection length d1 of the shielding member 22 is preferably greater than or equal to ⅛ and less than or equal to ¼ the minimum inner dimension d0 of the main body part 10 in a plane including the base of the shielding member 22. From the same standpoint, the projection length d2 of the shielding member 24 is preferably greater than or equal to ⅛ and less than or equal to ¼ the minimum inner dimension d0 of the main body part 10 in a plane including the base of the shielding member 24.

The shielding member 22 is inclined downward toward the inside of the main body part 10. Accordingly, odor can be trapped in the space between the lower surface of the shielding member 22 and the inner surfaces of the side surface parts 14. This makes it possible to enhance the odor-blocking effect. Furthermore, with this configuration, even if excreted urine has reached the upper surface of the shielding member 22, that urine flows along the incline and drains off from the leading end of the shielding member 22. This makes it possible to prevent urine from accumulating on the upper surface of the shielding member 22.

The shielding member 22 is partially bent downward. It is therefore difficult for the odor trapped by the shielding member 22 to escape to the exterior of the shielding member 22. This makes it possible to enhance the odor-blocking effect even more.

The shielding member 22 is, when viewed in plan view, provided across the entirety of the inner surfaces of the side surface parts 14. Accordingly, all channels through which odor rises along the inner surfaces of the side surface parts 14 can be covered by the shielding member 22.

The shielding member 24 is inclined downward toward the inside of the main body part 10. Accordingly, odor can be trapped in the space between the lower surface of the shielding member 24 and the inner surfaces of the side surface parts 14. This makes it possible to enhance the odor-blocking effect. Furthermore, with this configuration, even if excreted urine has reached the upper surface of the shielding member 24, that urine flows along the incline and drains off from the leading end of the shielding member 24. This makes it possible to prevent urine from accumulating on the upper surface of the shielding member 24.

The shielding member 24 is partially bent downward. It is therefore difficult for the odor trapped by the shielding member 24 to escape to the exterior of the shielding member 24. This makes it possible to enhance the odor-blocking effect even more.

The shielding member 24 is, when viewed in plan view, provided across the entirety of the inner surfaces of the side surface parts 14. Accordingly, all channels through which odor rises along the inner surfaces of the side surface parts 14 can be covered by the shielding member 24.

The granules 32 are laid directly upon the bottom surface part 12. It is therefore not necessary to provide a partition member between the granules 32 and the bottom surface part 12 in the main body part 10. This makes it possible to avoid complicating the structure of the main body part 10, and by extension, the toilet 1.

Second Embodiment

Figure 5:
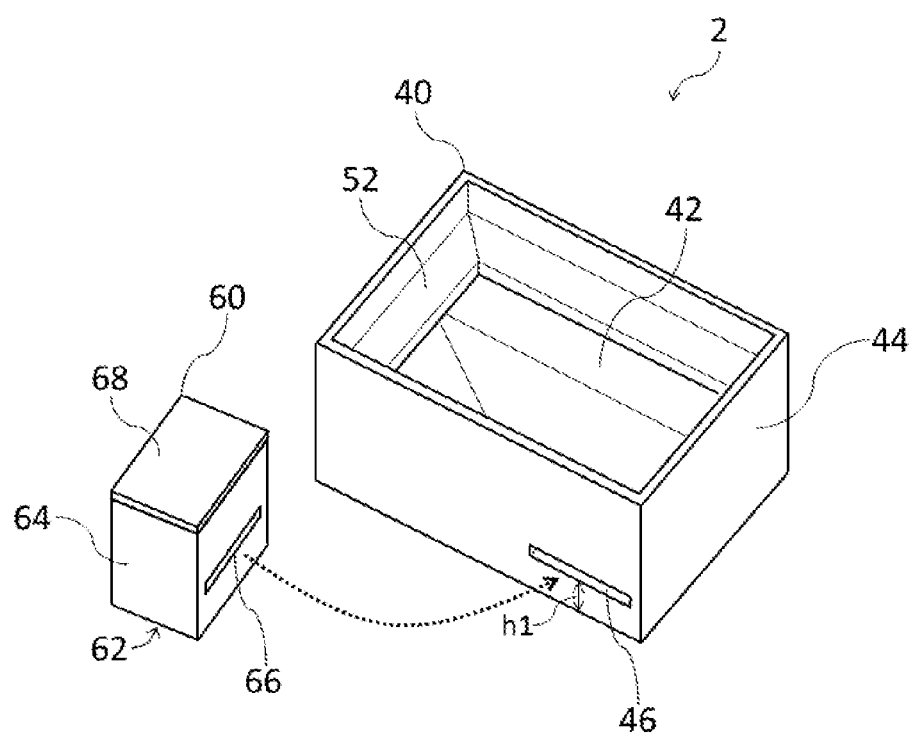
FIG. 5 is a perspective view illustrating a second embodiment of a toilet according to the present invention.

FIG. 5 is a perspective view illustrating a second embodiment of a toilet according to the present invention. A toilet 2 is a toilet for animal or human use, and includes a main body part 40, a shielding member 52 (a first shielding member), a shielding member 54 (a second shielding member), and a urine collection receptacle 60. However, the shielding member 54 is provided in a location that cannot be seen in this diagram (see FIG. 11). The main body part 40 is shaped as a box, and includes a bottom surface part 42 (a first bottom surface part) and a side surface part 44 (a first side surface part). An opening 46 (a first opening) is provided in the side surface part 44. The main body part 40 functions as a toilet bowl into which urine is excreted. A resin such as polypropylene or polyethylene can be used as the material of the main body part 40.

Figure 6:
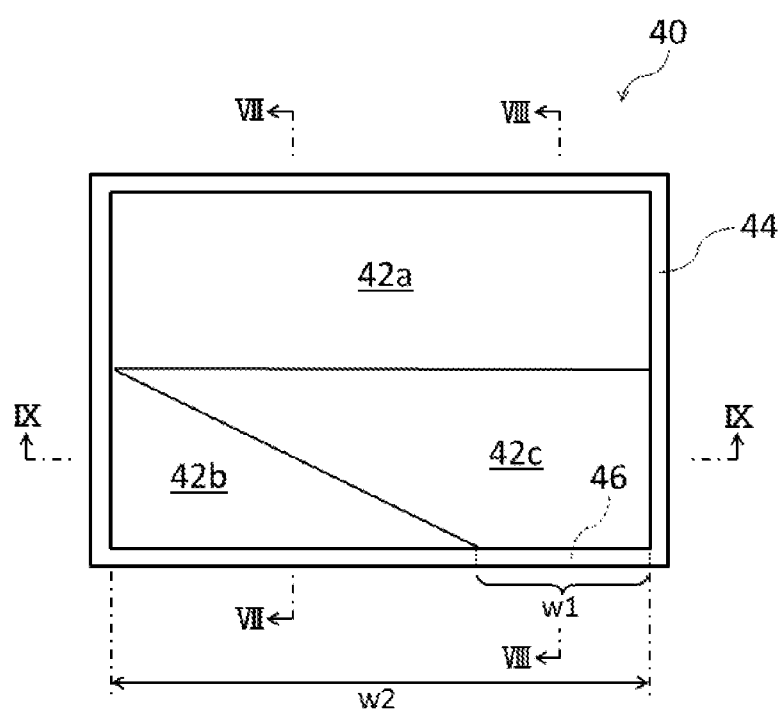
FIG. 6 is a plan view of a main body part 40 of the toilet of FIG. 5.

FIG. 6 is a plan view of the main body part 40. Note that the shielding members 52 and 54 are not illustrated in this diagram. As can be understood from FIG. 6, the bottom surface part 42 is substantially rectangular when viewed in plan view. Accordingly, the main body part 40 is provided with four of the side surface parts 44. The outer shape of the main body part 40 is substantially a parallelepiped.

Figure 7:
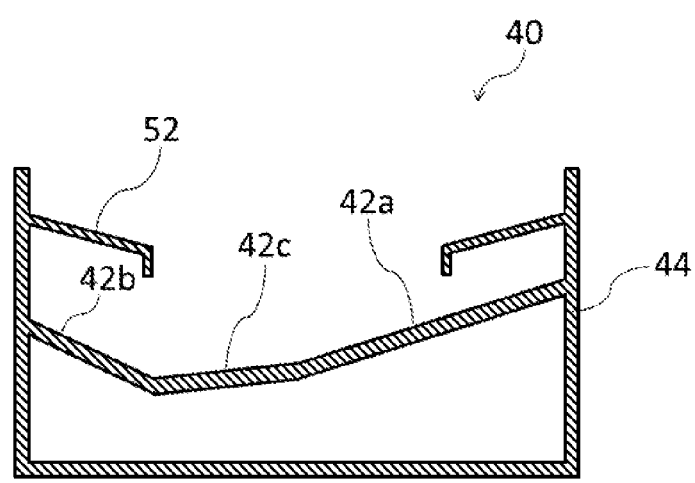
FIG. 7 is an end view taken along a line VII-VII in FIG. 6.
Figure 8:
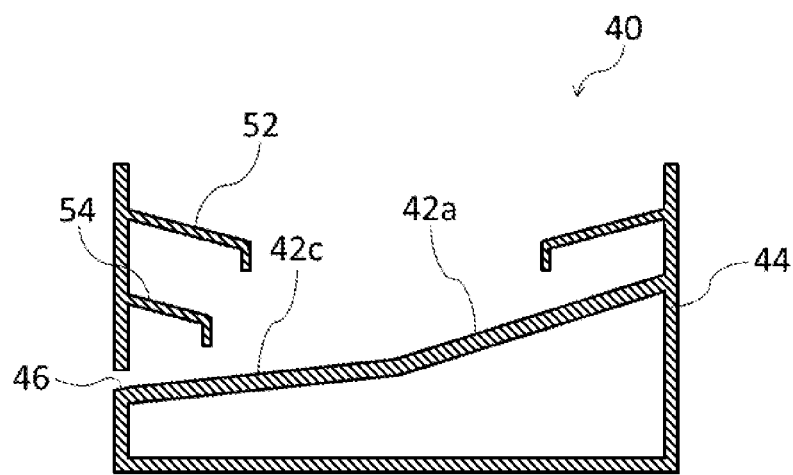
FIG. 8 is an end view taken along a line VIII-VIII in FIG. 6.
Figure 9:
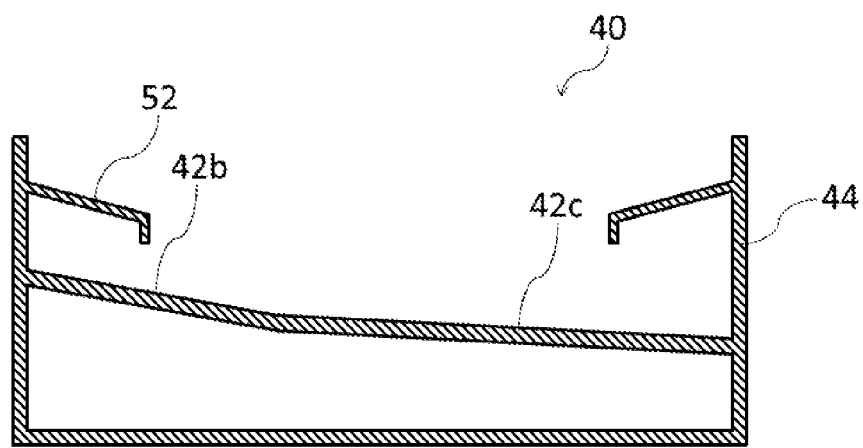
FIG. 9 is an end view taken along a line IX-IX in FIG. 6.

FIGS. 7, 8, and 9 are end views taken from a line VII-VII, a line VIII-VIII, and a line IX-IX, respectively, which are indicated in FIG. 6. As can be understood from these diagrams, the bottom surface part 42 is inclined such that the urine excreted into the main body part 40 flows to the opening 46. The bottom surface part 42 connects to the bottom surface of the opening 46. In the present embodiment, the entire bottom surface part 42 is inclined. The bottom surface part 42 is constituted by a plurality of connected flat surfaces 42a, 42b, and 42c. The flat surface 42a is inclined downward toward the flat surface 42c. The flat surface 42b is also inclined downward toward the flat surface 42c. The flat surface 42c is inclined downward toward the opening 46.

Returning to FIG. 5, the opening 46 is provided in one of the four side surface parts 44. The opening 46 has a horizontally long shape. The vertical length of the opening 46 (the length with respect to the vertical direction of the side surface parts 44) is greater than or equal to 3 mm and less than or equal to 10 mm, for example. The horizontal length of the opening 46 (the length with respect to the horizontal direction of the side surface part 44 in which the opening 46 is provided) is greater than or equal to 30 mm and less than or equal to 100 mm, for example. As illustrated in FIG. 6, a horizontal length w1 of the opening 46 is shorter than a horizontal width (inner dimension) w2 of the side surface part 44 in which the opening 46 is provided. The horizontal length w1 of the opening 46 is preferably less than or equal to ⅓ the horizontal width w2 of the side surface part 44.

Relative to a floor surface on which the main body part 40 is placed, a height h1 of the bottom end of the opening 46 (see FIG. 5) is preferably greater than or equal to 30 mm. The height h1 is equal to the distance from the bottom end of the side surface part 44 to the bottom end of the opening 46. In the present embodiment, the opening 46 is located at an end area of the side surface part 44. In other words, one side end of the opening 46 is present in the same plane as the inner surface of a side surface part 44 adjacent to the side surface part 44 in which the opening 46 is provided. Additionally, as can be understood from FIG. 8, a bottom surface of the opening 46 is inclined downward toward the outside of the main body part 40. To rephrase, the bottom surface of the opening 46 is inclined downward from the inner surface of the side surface part 44 toward the outer surface of the side surface part 44. The opening 46 is a part that discharges urine, which has been excreted into the main body part 40, to the exterior of the main body part 40. The opening 46 allows urine to pass but does not allow granules 34, which will be described later, to pass.

The shielding member 52 blocks the rise of odor from urine excreted into the main body part 40. The shielding member 52 has a plate shape, and is provided so as to project into the main body part 40 from the inner surfaces of the side surface parts 44. A base of the shielding member 52 is located on the inner surfaces of the side surface parts 44, and a leading end of the shielding member 52 is located within an inner space of the main body part 40. The shielding member 52 is inclined downward toward the inside of the main body part 40. Both an upper surface and a lower surface of the shielding member 52 are inclined downward toward the inside of the main body part 40. The shielding member 52 is also partially bent downward. Specifically, a part of the shielding member 52 near the leading end thereof is bent so as to face downward in the vertical direction. Note that no holes are provided in the shielding member 52. A resin such as polypropylene or polyethylene can be used as the material of the shielding member 52.

Figure 10:
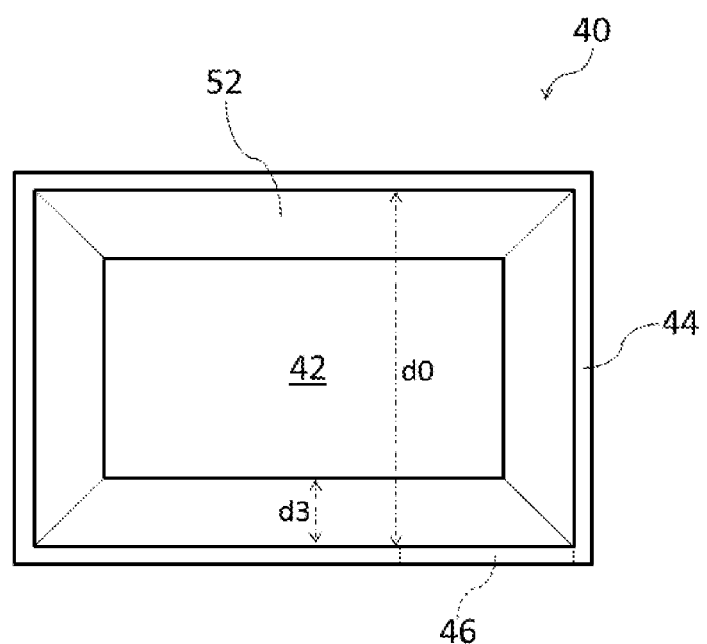
FIG. 10 is a diagram illustrating the structure of a shielding member 52.

FIG. 10 is a plan view of the main body part 40. As can be understood from this diagram, the shielding member 52 is, when viewed in plan view, provided across the entirety of the inner surfaces of the side surface parts 44. In other words, the shielding member 52 is provided in an annular shape. Thus while there is an opening in the part surrounded by the shielding member 52, that opening is large enough to not interfere with the passage of the granules 34, which will be described later. When viewed in plan view, a projection length d3 of the shielding member 52 is preferably greater than or equal to ⅛ and less than or equal to ¼ the minimum inner dimension d0 of the main body part 40 in a plane including the base of the shielding member 52.

The shielding member 54 blocks the rise of odor from urine excreted into the main body part 40. As can be understood from FIG. 8, the shielding member 54 has a plate shape, and is provided so as to project into the main body part 40 from the inner surfaces of the side surface parts 44. A base of the shielding member 54 is located on the inner surfaces of the side surface parts 44, and a leading end of the shielding member 54 is located within an inner space of the main body part 40. The shielding member 54 is located between the shielding member 52 and the bottom surface part 42. In other words, the shielding member 54 is provided at a lower position (a position closer to the bottom surface part 42) than the shielding member 52. The shielding member 54 is inclined downward toward the inside of the main body part 40. Both an upper surface and a lower surface of the shielding member 54 are inclined downward toward the inside of the main body part 40. The shielding member 54 is also partially bent downward. Specifically, a part of the shielding member 54 near the leading end thereof is bent so as to face downward in the vertical direction. Note that no holes are provided in the shielding member 54. A resin such as polypropylene or polyethylene can be used as the material of the shielding member 54.

Figure 11:
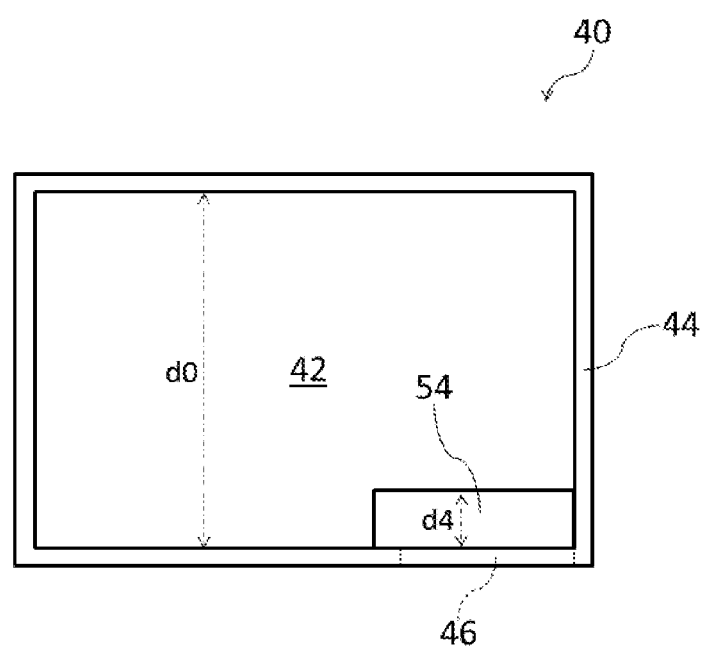
FIG. 11 is a diagram illustrating the structure of a shielding member 54.

FIG. 11 is a plan view of the main body part 40. Note that the shielding member 52 is not illustrated in this diagram. The shielding member 54 is, when viewed in plan view, provided in only part of the inner surfaces of the side surface parts 44 (a part including the area where the opening 46 is provided), as can be understood from this diagram. When viewed in plan view, a projection length d4 of the shielding member 54 is preferably greater than or equal to ⅛ and less than or equal to ¼ the minimum inner dimension d0 of the main body part 40 in a plane including the base of the shielding member 54. A projection length d3 of the shielding member 52 when viewed in plan view is longer than the projection length d4 of the shielding member 54 when viewed in plan view. At least part of the shielding member 52 and at least part of the shielding member 54 overlap when viewed in plan view. In the present embodiment, part of the shielding member 52 and the entire shielding member 54 overlap when viewed in plan view.

Figure 12:
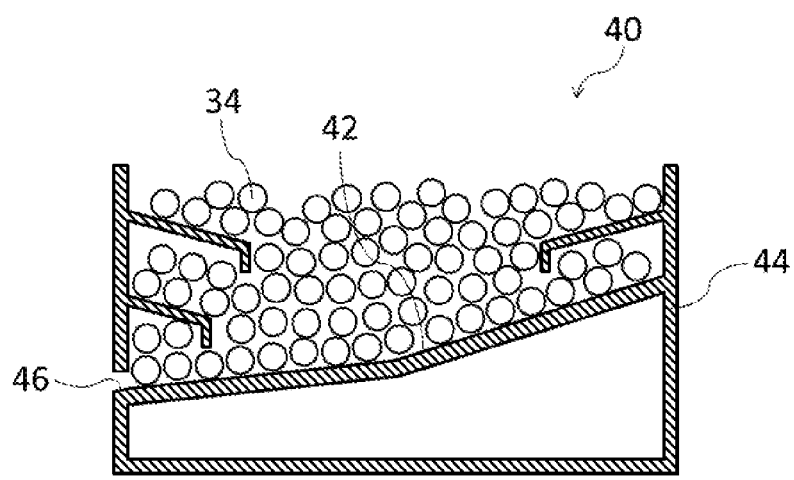
FIG. 12 is an end view illustrating the main body part 40 when in use.

FIG. 12 is an end view illustrating the main body part 40 when in use. This diagram illustrates the same end surface as that in FIG. 8. As illustrated in FIG. 12, when the toilet 2 is to be used, a plurality of granules 34 are laid within the main body part 40. The granules 34 are laid directly upon the bottom surface part 42. When laying the granules 34, the granules 34 poured into the main body part 40 from the upper part of the main body part 40 pass through the opening in the part surrounded by the shielding member 52 and fall onto the bottom surface part 42. In this manner, the granules 34 are laid within spaces under the shielding members 52 and 54 as well. These granules 34 are a permeable toilet bedding material that allows urine to permeate. In other words, the granules 34 have a property of absorbing urine not at all or almost not at all. Preferably, the granules 34 have antibacterial properties. Preferably, the granules 34 also have anti-odor or deodorizing properties. For example, a non-absorbent or low-absorbency known toilet bedding material can be used as the granules 34.

Returning to FIG. 5, the toilet 2 is provided with the urine collection receptacle 60. The urine collection receptacle 60 is a receptacle that collects urine that has passed through the opening 46. The urine collection receptacle 60 is shaped as a box, and includes a bottom surface part 62 (a second bottom surface part) and a side surface part 64 (a second side surface part). The bottom surface part 62 is substantially rectangular when viewed in plan view. Accordingly, the urine collection receptacle 60 is provided with four of the side surface parts 64. The outer shape of the urine collection receptacle 60 is, like the outer shape of the main body part 40, substantially a parallelepiped. However, the volume of the urine collection receptacle 60 is lower than the volume of the main body part 40. Additionally, unlike the bottom surface part 42, the bottom surface part 62 is not inclined.

An opening 66 (a second opening) is provided in the side surface part 64. The opening 66 is provided to allow urine discharged from the opening 46 to flow into the urine collection receptacle 60. The opening 66 is provided in one of the four side surface parts 64. The opening 66 is substantially the same shape and size as the opening 46. Specifically, the shape and size of the opening 46 in the outer surface of the side surface part 44 substantially matches the shape and size of the opening 66 in the outer surface of the side surface part 64. Furthermore, the urine collection receptacle 60 has a cover part 68 that covers, from above, a space surrounded by the bottom surface part 62 and the side surface parts 64. The cover part 68 is provided so as to be openable and closable. The cover part 68 is closed while the toilet 2 is in use. With the exception of the opening 66, the interior of the urine collection receptacle 60 is sealed when the cover part 68 is closed. A resin such as polypropylene or polyethylene can be used as the material of the urine collection receptacle 60.

Figure 13:
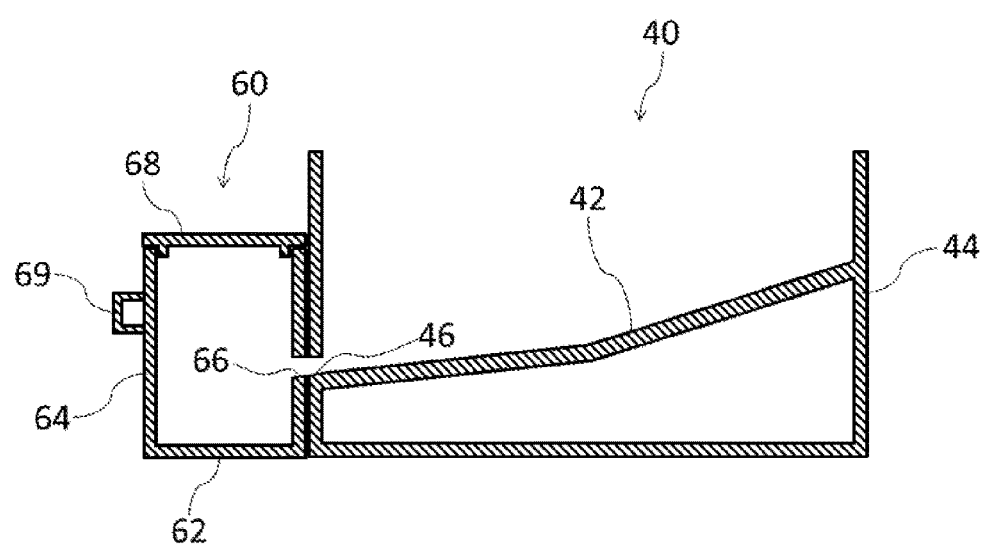
FIG. 13 is an end view illustrating a state where a urine collection receptacle 60 is arranged to the side of the main body part 40.

FIG. 13 is an end view illustrating a state where the urine collection receptacle 60 is arranged to the side of the main body part 40. As illustrated in this diagram, when the toilet 2 is in use, the urine collection receptacle 60 is arranged substantially flush against the side surface part 44 in which the opening 46 is provided. At this time, the opening 66 in the urine collection receptacle 60 overlaps with the opening 46 in the main body part 40. In the present embodiment, the opening 46 and opening 66 overlap with each other completely. In other words, the entirety of the opening 46 overlaps with the opening 66, and the entirety of the opening 66 overlaps with the opening 46. The urine collection receptacle 60 is secured to the main body part 40. An upper end of the side surface part 64 is at a position higher than the upper end of the opening 46. The bottom surface of the opening 66 is inclined downward toward the inner side of the urine collection receptacle 60. To rephrase, the bottom surface of the opening 66 is inclined downward from the outer surface of the side surface part 64 toward the inner surface of the side surface part 64. The urine collection receptacle 60 is provided with a grip 69. Specifically, the grip 69 is provided in the side surface part 64 opposite from the side surface part 64 in which the opening 66 is provided.

The urine collection receptacle 60 is removably secured to the main body part 40. Here, "removable" means that the urine collection receptacle 60 can be attached to and removed from the main body part 40 without causing damage to the main body part 40 and the urine collection receptacle 60.

Figure 14:
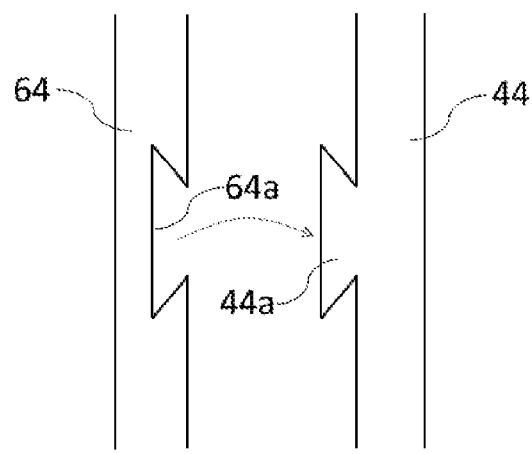
FIG. 14 is a diagram illustrating an example of a structure for removably securing the urine collection receptacle 60 to the main body part 40.

As illustrated in FIG. 14, this configuration can be realized by providing a projection 44a in the side surface part 44 and providing a groove 64a in the side surface part 64, for example. This diagram shows the side surface part 44 and the side surface part 64 from above. The projection 44a is provided in a part of the side surface part 44 that faces the side surface part 64. The projection 44a has a tapered cross-sectional shape in which the width widens as the projection 44a progresses away from the side surface part 44, and extends in the vertical direction of the side surface part 44 (the direction perpendicular to the plane of the diagram illustrated in FIG. 14). On the other hand, the groove 64a is provided in a part of the side surface part 64 that faces the side surface part 44. The groove 64a has a tapered cross-sectional shape in which the width widens as the groove 64a progresses toward the interior of the side surface part 64, and extends in the vertical direction of the side surface part 64. The cross-section of the groove 64a has substantially the same shape and size as the cross-section of the projection 44a.

Figure 15:
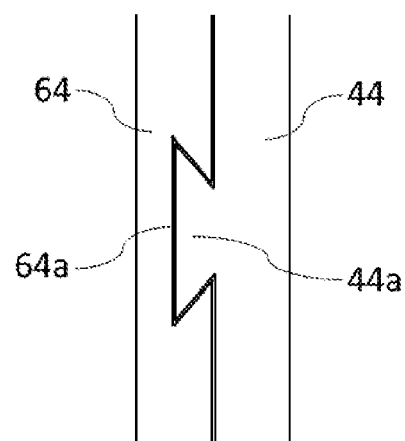
FIG. 15 is a diagram illustrating an example of a structure for removably securing the urine collection receptacle 60 to the main body part 40.

The urine collection receptacle 60 can be attached and secured to the main body part 40 by sliding the urine collection receptacle 60 in the vertical direction relative to the main body part 40 with the projection 44a fitted into the groove 64a as illustrated in FIG. 15. The urine collection receptacle 60 can be removed from the main body part 40 by sliding the urine collection receptacle 60 in the vertical direction relative to the main body part 40 and disengaging the projection 44a from the groove 64a.

Figure 16:
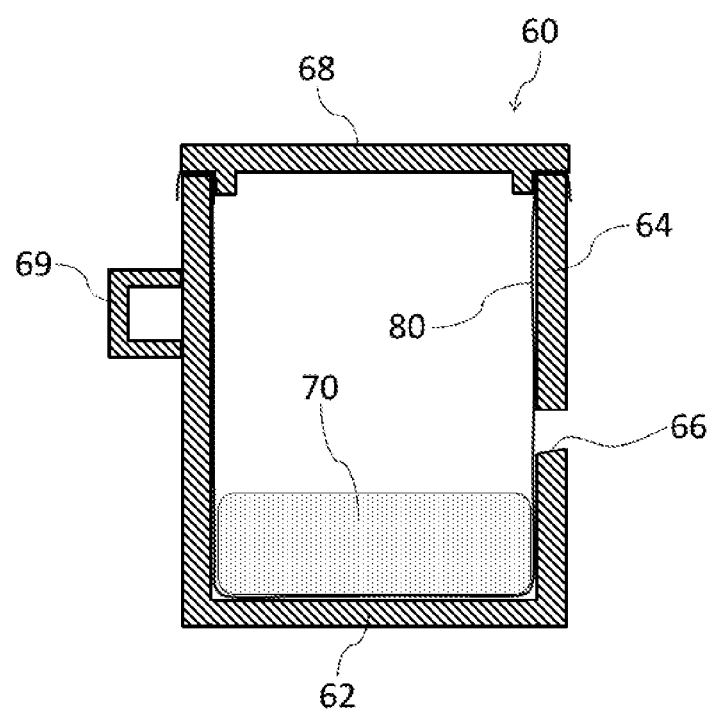
FIG. 16 is an end view illustrating the urine collection receptacle 60 when in use.

FIG. 16 is an end view illustrating the urine collection receptacle 60 when in use. As illustrated in this diagram, when the toilet 2 is in use, a water-absorbent material 70 that absorbs urine is provided within the urine collection receptacle 60. The water-absorbent material 70 is constituted by a mixture of a pulverized plant-based material and a water-absorbent polymer (a powder), for example. In this case, tea materials (tea leaves, tea husks, or the like) or coffee materials (coffee beans, instant coffee, coffee grounds, or the like) can be used as the plant-based material, for example. The branches of various types of plants, leaves (e.g., bamboo leaves), or flowers may be used as the plant-based material. Note that the water-absorbent material 70 may be constituted solely by a water-absorbent polymer. A granular toilet bedding material (e.g., obtained by pelletizing the above-described powder) or a sheet-type toilet bedding material (water-absorbent sheet) may be used as the water-absorbent material 70 as well.

The urine collection receptacle 60 is provided with a holding bag 80. The holding bag 80 is a bag that holds the water-absorbent material 70, and is provided within the urine collection receptacle 60. The holding bag 80 covers approximately the entirety of the upper surface of the bottom surface part 62 and the inner surfaces of the side surface parts 64. The holding bag 80 is folded over at the upper end of the side surface parts 64. The holding bag 80 is secured to the urine collection receptacle 60 by the folded-over part being sandwiched between the side surface parts 64 and the cover part 68.

Figure 17:
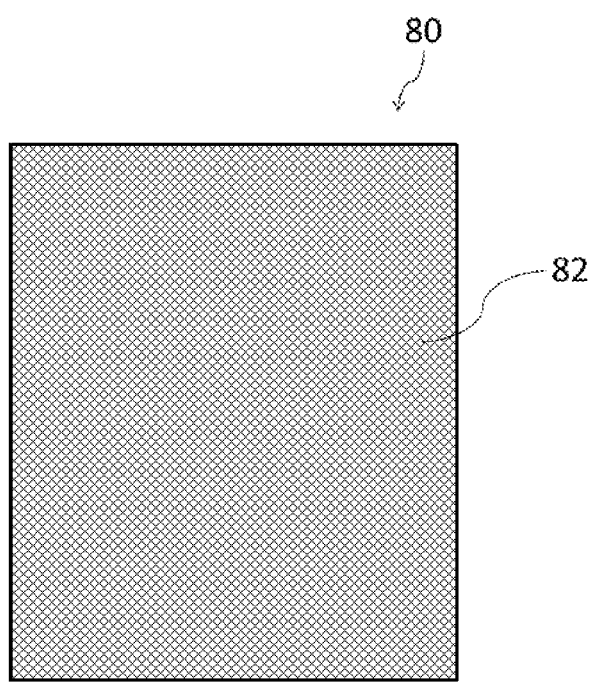
FIG. 17 is a front view illustrating a holding bag 80.

FIG. 17 is a front view of the holding bag 80. Holes 82 are provided in the holding bag 80. The holes 82 allow urine to pass but do not allow the water-absorbent material 70 to pass. In the present embodiment, at least part of the holding bag 80 (a part including a region overlapping with the opening 66) has a mesh form, and the mesh openings in that part constitute the holes 82. FIG. 17 illustrates an example in which the entire holding bag 80 has a mesh form. Polyethylene, polyvinyl chloride, nylon, and the like can be used as the material of the holding bag 80.

Effects of the toilet 2 will be described. In the toilet 2, the shielding member 52 that blocks odor from urine from rising is provided in the main body part 40. Thus even if odor rises from urine within the main body part 40, that odor can be blocked, and the escape of odor from the upper part of the main body part 40 can be suppressed.

Furthermore, the shielding member 54 is provided between the shielding member 52 and the bottom surface part 42. Accordingly, odor rising in the main body part 40 can be blocked in two stages. This makes it possible to more effectively suppress the escape of odor from the upper part of the main body part 40.

The projection length d3 of the shielding member 52 when viewed in plan view is longer than the projection length d4 of the shielding member 54 when viewed in plan view. Accordingly, odor not completely trapped by the shielding member 54 is more easily trapped by the shielding member 52.

Odor from the urine excreted into the main body part 40 rises while dispersing in the horizontal direction. Odor therefore flows more easily along the inner surfaces of the side surface parts 44 in particular. Providing the shielding members 52 and 54 so as to project from the inner surfaces of the side surface parts 44 toward the inner side of the main body part 40 is advantageous in terms of catching odor rising along the inner surfaces of the side surface parts 44.

Increasing the projection length d3 of the shielding member 52 is advantageous in terms of enhancing the odor-blocking effect. On the other hand, if the projection length d3 is too long, problems such as the granules 34 clogging the opening in the part surrounded by the shielding member 52 may arise. From this standpoint, the projection length d3 of the shielding member 52 is preferably greater than or equal to ⅛ and less than or equal to ¼ the minimum inner dimension d0 of the main body part 40 in a plane including the base of the shielding member 52. From the same standpoint, the projection length d4 of the shielding member 54 is preferably greater than or equal to ⅛ and less than or equal to ¼ the minimum inner dimension d0 of the main body part 40 in a plane including the base of the shielding member 54.

The shielding member 52 is inclined downward toward the inside of the main body part 40. Accordingly, odor can be trapped in the space between the lower surface of the shielding member 52 and the inner surfaces of the side surface parts 44. This makes it possible to enhance the odor-blocking effect. Furthermore, with this configuration, even if excreted urine has reached the upper surface of the shielding member 52, that urine flows along the incline and drains off from the leading end of the shielding member 52. This makes it possible to prevent urine from accumulating on the upper surface of the shielding member 52.

The shielding member 52 is partially bent downward. It is therefore difficult for the odor trapped by the shielding member 52 to escape to the exterior of the shielding member 52. This makes it possible to enhance the odor-blocking effect even more.

The shielding member 52 is, when viewed in plan view, provided across the entirety of the inner surfaces of the side surface parts 44. Accordingly, all channels through which odor rises along the inner surfaces of the side surface parts 44 can be covered by the shielding member 52.

The shielding member 54 is inclined downward toward the inside of the main body part 40. Accordingly, odor can be trapped in the space between the lower surface of the shielding member 54 and the inner surfaces of the side surface parts 44. This makes it possible to enhance the odor-blocking effect. Furthermore, with this configuration, even if excreted urine has reached the upper surface of the shielding member 54, that urine flows along the incline and drains off from the leading end of the shielding member 54. This makes it possible to prevent urine from accumulating on the upper surface of the shielding member 54.

The shielding member 54 is partially bent downward. It is therefore difficult for the odor trapped by the shielding member 54 to escape to the exterior of the shielding member 54. This makes it possible to enhance the odor-blocking effect even more.

The shielding member 54 is, when viewed in plan view, provided in only part of the inner surfaces of the side surface parts 44. Thus when the bottom surface part 42 is inclined as in the present embodiment, the shielding member 54 can be provided at a lower position than the highest point of the bottom surface part 42, which increases the freedom of design. In particular, the stated part where the shielding member 54 is provided includes an area where the opening 46 is provided. Accordingly, the shielding member 54 covers the area above the vicinity of the entrance to the opening 46. Thus even if odor from urine discharged to the exterior of the main body part 40 has flowed into the main body part 40 through the opening 46, that odor can be effectively blocked from rising.

The opening 46 is provided in the side surface part 44 of the main body part 40. The bottom surface part 42 of the main body part 40 is inclined such that urine flows to the opening 46. Accordingly, urine excreted into the main body part 40 passes among the granules 34, flows upon the bottom surface part 42, and then reaches the opening 46. The urine that has reached the opening 46 passes through the opening 46 and is discharged to the exterior of the main body part 40. This configuration does not allow urine to remain in the main body part 40, and is thus advantageous in suppressing the escape of odor from the upper part of the main body part 40.

The entirety of the bottom surface part 42 is inclined. As such, urine can be reliably conducted to the opening 46 regardless of on what position of the bottom surface part 42 the urine has been excreted.

The opening 46 has a horizontally long shape. In other words, the opening 46 is longer horizontally and shorter vertically. A liquid such as urine has a tendency to spread out horizontally. As such, increasing the horizontal length of the opening 46 facilitates the quick passage of a large amount of urine. Thus even if a large amount of urine has been excreted, that urine can be smoothly discharged to the exterior of the main body part 40 through the opening 46. On the other hand, reducing the vertical length of the opening 46 is advantageous in terms of preventing the granules 34 from passing through the opening 46.

The bottom surface of the opening 46 is inclined downward toward the outside of the main body part 40. This makes it possible for urine excreted into the main body part 40 to be more smoothly discharged to the exterior of the main body part 40 through the opening 46.

The granules 34 are laid directly upon the bottom surface part 42. It is therefore not necessary to provide a partition member between the granules 34 and the bottom surface part 42 in the main body part 40. This makes it possible to avoid complicating the structure of the main body part 40, and by extension, the toilet 2.

The toilet 2 is provided with the urine collection receptacle 60. This makes it possible to easily dispose of the urine discharged to the exterior of the main body part 40 through the opening 46.

The urine collection receptacle 60 is arranged substantially flush against the side surface part 44 in which the opening 46 is provided. Thus the urine discharged from the opening 46 can be conducted directly into the urine collection receptacle 60 without providing means for transferring the urine between the main body part 40 and the urine collection receptacle 60.

The opening 66 is provided in the side surface part 64. Accordingly, the urine discharged from the opening 46 can be conducted to the urine collection receptacle 60 with a simple configuration. In other words, the urine discharged from the opening 46 flows into the urine collection receptacle 60 through the opening 66, which connects with the opening 46. Additionally, the urine is taken into the urine collection receptacle 60 from the side surface part 64, and thus the height of the side surface part 64 can be increased. Increasing the height of the side surface part 64 is advantageous in terms of increasing the volume of the urine collection receptacle 60 and holding a larger amount of urine.

The bottom surface of the opening 66 is inclined downward toward the inner side of the urine collection receptacle 60. This makes it possible for the urine discharged from the opening 46 to flow more smoothly through the opening 66 and into the urine collection receptacle 60.

The upper end of the side surface part 64 is at a position higher than the upper end of the opening 46 when the urine collection receptacle 60 is installed in the toilet 2. This makes it possible to suppress the flow of odor, which has been produced by urine accumulated within the urine collection receptacle 60, into the main body part 40 through the opening 46.

The urine collection receptacle 60 has the cover part 68 that covers, from above, the space surrounded by the bottom surface part 62 and the side surface parts 64. This makes it possible to prevent odor, which has been produced by urine accumulated within the urine collection receptacle 60, from escaping to the exterior from the upper part of the urine collection receptacle 60.

The urine collection receptacle 60 can be attached to and removed from the main body part 40. This makes it easy to dispose of urine that has accumulated in the urine collection receptacle 60, clean the main body part 40 and the urine collection receptacle 60, and so on. In other words, urine disposal, cleaning, and so on can be carried out more easily by removing the urine collection receptacle 60 from the main body part 40.

The urine collection receptacle 60 is provided with the grip 69. This makes it easy to attach and remove the urine collection receptacle 60 to and from the main body part 40.

Having the opening 46 (and the opening 66) at higher positions is advantageous for preventing urine that has accumulated in the urine collection receptacle 60 from leaking to the exterior of the urine collection receptacle 60 through the opening 66. From this standpoint, the height h1 of the bottom end of the opening 46 (see FIG. 5) is preferably greater than or equal to 30 mm.

When the toilet 2 is in use, the water-absorbent material 70 that absorbs urine is provided within the urine collection receptacle 60. This makes it more difficult for urine to leak to the exterior of the urine collection receptacle 60 than in a situation where the water-absorbent material 70 is not provided.

When the water-absorbent material 70 is a mixture of a pulverized plant-based material and a water-absorbent polymer, a deodorizing effect of the plant-based material makes it possible to reduce urine odor. The absorbency effect of the water-absorbent polymer makes it possible to absorb a greater amount of urine.

A particularly good deodorizing effect can be achieved by using a tea material or coffee material as the plant-based material. Using refuse such as tea husks or coffee grounds makes it possible to put such refuse to good use as well.

The urine collection receptacle 60 is provided with the holding bag 80. Accordingly, the water-absorbent material 70 that has absorbed urine can be removed from the urine collection receptacle 60 in the holding bag 80. This makes it even easier to dispose of urine that has accumulated in the urine collection receptacle 60.

The holes 82, which allow urine to pass without allowing the water-absorbent material 70 to pass, are provided in the holding bag 80. This makes it possible to conduct urine that has passed through the opening 66 into the holding bag 80 while preventing the water absorbent material 70 from spilling outside of the holding bag 80.

At least part of the holding bag 80 has a mesh form, and the mesh openings in that part constitute the holes 82. This makes it possible to realize the holding bag 80 having the holes 82 with a simple configuration.

The present invention is not limited to the foregoing embodiment, and many variations can be made thereon. The foregoing embodiments describe examples in which two shielding members are provided. However, only one shielding member may be provided instead. For example, in the first embodiment, only one of the shielding member 22 and the shielding member 24 may be provided, and in the second embodiment, only one of the shielding member 52 and the shielding member 54 may be provided. Alternatively, three or more of the shielding members may be provided.

Figure 18:
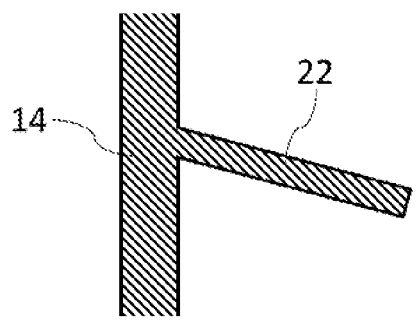
FIG. 18 is a diagram illustrating a variation on the shielding member.

The foregoing embodiments describe examples in which the shielding member 22 is partially bent. However, it is not necessary for the shielding member 22 to be partially bent. In other words, the shielding member 22 may follow a single plane from the base to the leading end, as illustrated in FIG. 18. The same applies to the shielding members 24, 52, and 54.

Figure 19:
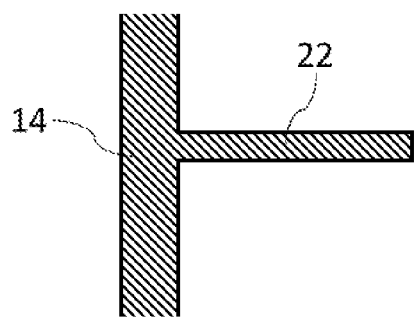
FIG. 19 is a diagram illustrating another variation on the shielding member.

The foregoing embodiments describe examples in which the shielding member 22 is inclined. However, it is not necessary for the shielding member 22 to be inclined. In other words, the shielding member 22 may project horizontally, as illustrated in FIG. 19. The same applies to the shielding members 24, 52, and 54.

The foregoing embodiments describe examples in which the main body part is not provided with a partition member. However, the main body part may be provided with a partition member. Granules that allow urine to pass are laid upon that partition member. Additionally, holes that allow urine to pass but do not allow the granules to pass are formed in the partition member. In this case, a shielding member is provided in the space above the partition member, the space below the partition member, or both.

LIST OF REFERENCE NUMERALS

1 Toilet
2 Toilet
10 Main body part
12 Bottom surface part (first bottom surface part)
14 Side surface part (first side surface part)
22 Shielding member (first shielding member)
24 Shielding member (second shielding member)
32 Granule
34 Granule
40 Main body part
42 Bottom surface part (first bottom surface part)
42a, 42b, 42c Flat surface
44 Side surface part (first side surface part)
44a Projection
46 Opening (first opening)
52 Shielding member (first shielding member)
54 Shielding member (second shielding member)
60 Urine collection receptacle
62 Bottom surface part (second bottom surface part)
64 Side surface part (second side surface part)
64a Groove
66 Opening (second opening)
68 Cover part
69 Grip
70 Water-absorbent material
80 Holding bag
82 Hole

The invention claimed is:

1. A toilet comprising:
a main body part that receives excreted urine, the main body part including a first bottom surface part and a first side surface part and having a box shape; and
a first shielding member, provided projecting from an inner surface of the first side surface part toward the inside of the main body part, that blocks odor from the urine from rising.

2. The toilet according to claim 1,
wherein the first shielding member inclines downward toward the inside of the main body part.

3. The toilet according to claim 1,
wherein the first shielding member partially bends downward.

4. The toilet according to claim 1,
wherein when viewed in plan view, the first shielding member extends across the entirety of the inner surface of the first side surface part.

5. The toilet according to claim 1, further comprising:
a second shielding member, provided projecting from the inner surface of the first side surface part toward the inside of the main body part, that blocks odor from the urine from rising, wherein the second shielding member is located between the first shielding member and the first bottom surface part.

6. The toilet according to claim 5, wherein the second shielding member inclines downward toward the inside of the main body part.

7. The toilet according to claim 5, wherein the second shielding member partially bends downward.

8. The toilet according to claim 5, wherein when viewed in plan view, the second shielding member extends across the entirety of the inner surface of the first side surface part.

9. The toilet according to claim 5, wherein at least part of the first shielding member and at least part of the second shielding member overlap when viewed in plan view.

10. The toilet according to claim 5, wherein a projection length of the first shielding member when viewed in plan view is longer than a projection length of the second shielding member when viewed in plan view.

11. The toilet according to claim 1, wherein the first side surface part includes a first opening through which the urine passes; and the first bottom surface part inclines so that the urine excreted into the main body part flows to the first opening.

12. The toilet according to claim 11, wherein a bottom surface of the first opening inclines downward toward the outside of the main body part.

13. The toilet according claim 11, wherein a plurality of granules that allow urine to permeate are laid within the main body part.

14. The toilet according to claim 13, wherein the granules are laid directly on the first bottom surface part.

15. The toilet according to claim 11, further comprising: a urine collection receptacle that holds urine that has passed through the first opening.

16. The toilet according to claim 15, wherein the urine collection receptacle is arranged substantially flush against the first side surface part in which the first opening is provided.

17. The toilet according to claim 15, wherein the urine collection receptacle has a box shape including a second bottom surface part and a second side surface part.

18. The toilet according to claim 17, wherein the urine collection receptacle includes a cover part that covers, from above, a space surrounded by the second bottom surface part and the second side surface part.

19. The toilet according to claim 17, wherein the second side surface part includes a second opening that allows urine discharged from the first opening to flow into the urine collection receptacle.

20. The toilet according to claim 19, wherein a bottom surface of the second opening inclines downward toward the inside of the urine collection receptacle.

* * * * *